United States Patent [19]
Shishkin et al.

[11] Patent Number: 4,790,934
[45] Date of Patent: Dec. 13, 1988

[54] APPARATUS FOR FILTERING FLUID MEDIUM

[75] Inventors: Viktor V. Shishkin; Nikolai F. Kryazhevskikh; Jury P. Shapovalov, all of Krasnodar, U.S.S.R.

[73] Assignee: Inzhenerny Tsentr Truboprovod, Krasnodar, U.S.S.R.

[21] Appl. No.: 124,778

[22] PCT Filed: Dec. 17, 1986

[86] PCT No.: PCT/SU86/00130
§ 371 Date: Jul. 28, 1987
§ 102(e) Date: Jul. 28, 1987

[87] PCT Pub. No.: WO87/03821
PCT Pub. Date: Jul. 2, 1987

[30] Foreign Application Priority Data

Dec. 24, 1985 [SU] U.S.S.R. .............................. 3988607

[51] Int. Cl.⁴ .............................................. B01D 33/00
[52] U.S. Cl. ........................................ 210/189; 55/242; 55/290; 55/351; 210/329; 210/354; 210/391
[58] Field of Search ................. 55/242, 285, 290, 351, 55/390; 210/189, 228, 282, 328, 329, 354, 404, 484, 391

[56] References Cited

U.S. PATENT DOCUMENTS

| 2,196,793 | 4/1940 | Hall | 210/354 X |
| 2,268,065 | 12/1941 | Smith | 210/354 |
| 2,677,467 | 5/1954 | Giorgini | 210/328 |
| 2,731,149 | 1/1956 | Findlay | 210/189 |
| 3,620,373 | 11/1971 | Crell et al. | 210/354 X |
| 3,623,607 | 11/1971 | Loos | 210/355 X |
| 3,931,015 | 1/1976 | Jenkins | 210/232 |
| 4,253,959 | 3/1981 | Tafara | 210/232 |

FOREIGN PATENT DOCUMENTS 2124717 2/1974 Fed. Rep. of Germany .
79522 7/1948 U.S.S.R. .

Primary Examiner—Robert Spitzer
Attorney, Agent, or Firm—Ladas & Parry

[57] ABSTRACT

An apparatus for filtering a fluid medium has a sealed ring-shaped body in the interior of which is movably mounted a flexible filtering member having a toroidal shape. Slide valves divide the interior of the body into two portions, one of which receives the supply of fluid medium to be cleaned and removes the fluid medium cleaned by the filtering member, while the other cleans the filtering member by removing cake from it.

1 Claim, 1 Drawing Sheet

U.S. Patent  Dec. 13, 1988  4,790,934
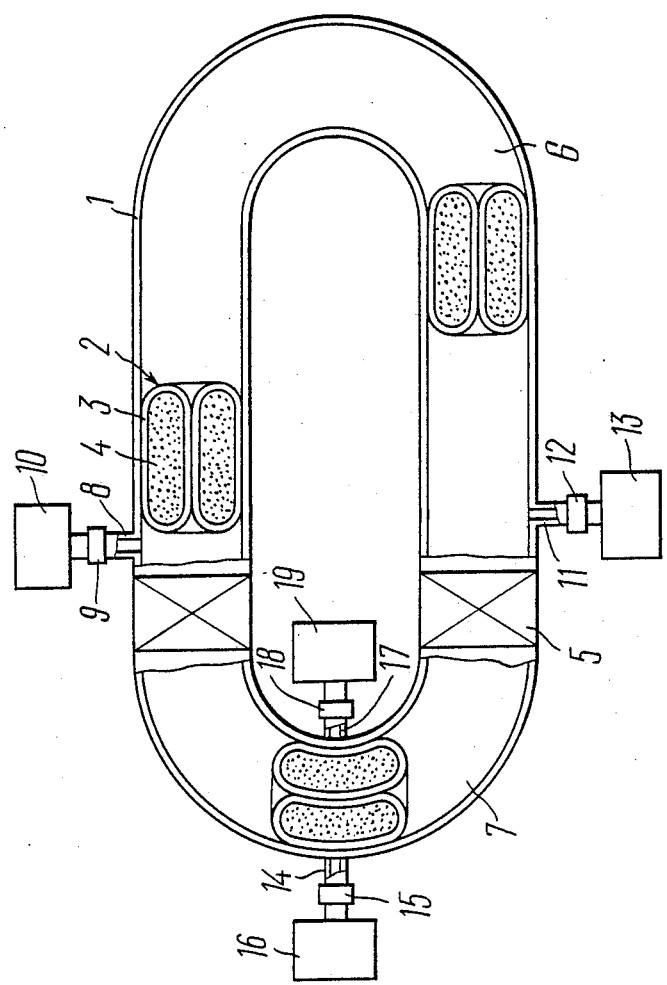

APPARATUS FOR FILTERING FLUID MEDIUM

FIELD OF THE INVENTION

The present invention relates to cleaning of a fluid medium from suspended particles and various inclusions and, more particularly, the invention relates to an apparatus for filtering a fluid medium.

This invention can be used very effectively for removing mechanical impurities from chemical products, purification of drinking and circulating water, cleaning of industrial effluents from silt and slag, as well as for air dedusting.

Furthermore, the invention can be used for removing various chemical impurities from liquids and gases and for drying air and gas.

BACKGROUND OF THE INVENTION

Cleaning of liquids and gases from various harmful impurities and solids has presently gained wide application. However, the present-day filtering systems are either bulky or feature inadequate output capacity or have inadequate sealing during their operation, while this parameter is very important when filtering harmful or aggressive media. So far, no efficient devices are available for cleaning agressive fluid media containing a lot of suspended particles, e.g. devices for cleaning effluents from cattlebreeding farms.

Known in the art is an electromagnetic separator comprising a perforated tray located in a magnetic field and rotated by a drive.

This device is disadvantageous because structurally it is overcomplicated.

Also known in the art is an apparatus for filtering liquids comprising a hermetically sealed housing having a slot-shaped opening, through which an endless filtering band is conveyed. The upper portion of the housing is connected to means for supplying a liquid to be cleaned, while the bottom portion thereof is connected to means for removing the clean liquid. The apparatus is also provided with a means for removing filter cake from the band (USSR Inventor's Certificate No. 79,522, B01 B 33/04, 1948).

A significant disadvantage of this apparatus consists in its low efficiency, since the body features inadequate tightness and this does not allow one to increase the pressure inside this body. In addition, the apparatus has a very complicated design, which practically does not enable reliable sealing to be provided, and this deteriorates the operating conditions of this apparatus.

Another disadvantage of the apparatus is intensive wear of the filtering element (band) in the process of operation due to sticking and solidification of a filter cake on the sealing element mounted in the slot-shaped opening of the body. The cake thus transforms into an abrasive material which wears off the band.

What is more, the inadequate sealing of the apparatus considerably impairs the cleaning quality since a portion of the liquid being cleaned bypasses the filtering member and flows into the bottom part of the apparatus, where the clean liquid is accumulated.

SUMMARY OF THE INVENTION

This invention aims at providing such an apparatus for filtering a fluid medium, which would ensure high hermeticity of the chamber at reduced wear of the filtering element.

These aims are attained by providing an apparatus for filtering a fluid medium comprising a hollow body, a movable flexible filtering member arranged in said body, and means for supplying a medium to be cleaned, removing the cleaned medium, cleaning of the filtering member and removing the cake respectively; according to the invention, the filtering member is shaped as a toroid, while the body is hermetically sealed, ring-shaped and is equipped with slide valves dividing the body space into two portions, one portion communicating, respectively, with the means for supplying the medium to be cleaned and with the means for removing of the clean medium and the other portion communicating with the means for cleaning the filtering element and for removing the cake.

The claimed invention makes it possible to substantially increase the efficiency of the filtering apparatus. This is achieved by providing the apparatus with a ring-shaped body and this much facilitates sealing of the apparatus and makes it possible to clean the filtering member in the process of operation of the apparatus. Furthermore, good tightness of the apparatus makes it possible to practically eliminate emission of the medium being cleaned into the atmosphere and to increase the conveniency of running the apparatus.

The toroidal filtering member rolling along the ring-shaped body during the supply of a medium being cleaned makes it possible to reduce the wear of the filtering member in the process of its operation and this, in turn, increases the service life of the apparatus.

Still another advantage of the present invention compared to the prior art is a significant increase of the quality of filtering the fluid medium due to a possibility of increasing the fluid medium pressure in the sealed body and due to continuous cleaning of the filtering member in the process of operation of the apparatus.

In addition, the technological possibilities of the apparatus are expanded since the filtering member space can be filled with any chemical reagent or adsorbent.

BRIEF DESCRIPTION OF THE DRAWINGS

Other objects and inherent advantages of the present invention will be apparent from the following detailed description of one particular embodiment of the invention with reference to the accompanying drawing showing a schematic diagram of the apparatus for filtering a fluid medium, according to the invention.

BEST MODE OF CARRYING OUT THE INVENTION

The apparatus comprises a hollow hermetically sealed ring-shaped body 1, in the inner space of which there are mounted a few flexible toroidal filtering members 2. The amount of the filtering members 2 is selected depending on the type of the fluid medium and a required degree of its cleaning. Each filtering member 2 can be made, for example, in the form of a grid 3 filled with a filtering material 4 (sand, chemical wire tangle, cotton batting, commercial felt, and any chemical reagent or adsorbent). Mounted in the space of the body 1 are two slide valves 5 dividing the space into two portions 6,7, one portion 6 of which is communicated through a branch pipe 8 and a valve 9 with a means 10 for supplying a medium to be cleaned and is communicated through a branch pipe 11 and a valve 12 to a means for removing the clean medium. The other portion 7 of the space of the body 1 is communicated through the branch pipe 14 and a valve 15 with means 16 for cleaning the filtering member 2, while through a branch pipe 17 and a valve 18 it is communicated with a means 19 for removing the cake.

Mounted in front of the slide valves 5 in the body 1 are limit switches (not shown) electrically connected to the slide valves 5.

The apparatus operates as follows.

The medium to be cleaned is forced under pressure into the portion 6 of the space of the body 1.

Using the means 10, the medium to be cleaned is fed under pressure through the valve 9 and branch pipe 8 into the portion 6 of the space of the body 1. This medium starts to move the filtering member 2. The filtering member 2, while rolling, moves towards the portion 7 of the space of the body 1. In this case the fluid medium passes through the filtering member 2 and is cleaned from any deposit (or dust), which is arrested by the filter. The clean medium before the filtering member 2 is continuously removed by the means 13 through the valve 12 and the branch pipe 11. As soon as the filtering member 2 approaches one of the slide valves 5, it closes the contacts of the limit switch thus sending a control signal to the slide valve 5. The latter opens and admits the filtering member 2 into the portion 7 of the space of the body 1, then the slide valve 5 closes.

After the filtering member 2 has been set in front of the means 16 for its cleaning, the valve 15 opens and the washing water is fed under pressure to the filtering member 2 through the branch pipe 14. At the same time, the valve 18 opens and the washing water with the cake is removed by the means 19 from the filtering member 2 through the branch pipe 17.

After the filtering member 2 has been washed, this member moves to the slide valve 5. As soon as filtering member 2 has approached the slide valve 5, the member 2 closes the limit switch, the second slide valve 5 opens and the filtering member 2 comes out of the space 7 into the space 6 of the body 1 closing the other limit switch, then the slide valve 5 closes. After that the operating cycle is repeated.

The operation of the slide valves 5 may be controlled by any well known system, which is not described heretofore.

INDUSTRIAL APPLICABILITY

The invention can be used for removing mechanical impurities from drinking circulating water.

It can also be used for removing mechanical inclusions from various chemical solutions, and for gas dedusting.

In addition, when using an appropriate filtering material, the invention can find application for separating certain chemical compounds from chemical products, as well as for dehumidifying and dedusting gases.

We claim:

1. An apparatus for filtering a fluid medium comprising a hollow body (1), a movable flexible filtering member (2) arranged in the body (1), and means (10, 13, 16, 19) for supplying a medium to be cleaned, removing the clean medium, cleaning the filtering member (2), and removing the cake, characterized in that the filtering member (2) is shaped as a toroid, whereas the body (1) is hermetically sealed, ring-shaped, and is equipped with slide valves (5) dividing the interior of the body (1) into two portions (6. 7), one portion (6) communicating, respectively, with the means (10, 13) for supplying the medium to be cleaned and removing the clean medium, and the other portion communicating with the means (16, 19) for cleaning the filtering member (2) and evacuating the cake.

* * * * *